United States Patent
Terentyev et al.

(10) Patent No.: US 6,917,360 B2
(45) Date of Patent: Jul. 12, 2005

(54) SYSTEM AND METHOD FOR ADAPTIVELY LABELING MULTI-DIMENSIONAL IMAGES (75) Inventors: Igor Terentyev, Houston, TX (US); Simon G. Fleury, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 490 days.

(21) Appl. No.: 10/177,272

(22) Filed: Jun. 21, 2002

(65) Prior Publication Data

US 2003/0234782 A1 Dec. 25, 2003

(51) Int. Cl.$^7$ .............................................. G06T 15/00
(52) U.S. Cl. ...................................................... 345/419
(58) Field of Search ................................. 345/418, 419; 715/517, 518, 712, 850, 851, 853, 854, 855

(56) References Cited

U.S. PATENT DOCUMENTS

| | | | | |
|---|---|---|---|---|
| 5,276,785 A | | 1/1994 | Mackinlay et al. | 345/427 |
| 5,513,303 A | | 4/1996 | Robertson et al. | 345/419 |
| 5,798,761 A | | 8/1998 | Isaacs | 345/419 |
| 5,801,704 A | * | 9/1998 | Oohara et al. | 715/856 |
| 5,812,493 A | | 9/1998 | Robein et al. | 367/25 |
| 6,012,018 A | | 1/2000 | Hornbuckle | 702/16 |
| 6,035,255 A | | 3/2000 | Murphy et al. | 702/11 |
| 6,070,125 A | | 5/2000 | Murphy et al. | 702/11 |
| 6,128,577 A | | 10/2000 | Assa et al. | 702/2 |
| 6,138,075 A | | 10/2000 | Yost | 702/14 |
| 6,215,499 B1 | | 4/2001 | Neff et al. | 345/419 |
| 6,362,817 B1 | * | 3/2002 | Powers et al. | 345/419 |
| 6,690,393 B2 | * | 2/2004 | Heron et al. | 715/757 |

FOREIGN PATENT DOCUMENTS

| | | |
|---|---|---|
| WO | WO 01/48700 A1 | 7/2001 |
| WO | WO 02/21158 A2 | 3/2002 |

* cited by examiner

Primary Examiner—Phu K. Nguyen
(74) Attorney, Agent, or Firm—Victor H. Segura; Brigitte L. Echols (57) ABSTRACT

Techniques for labeling a two-dimensional image of a multi-dimensional object include displaying the two-dimensional image of the multi-dimensional object. A plurality of label regions are calculated in the two-dimensional image, the plurality of label regions being substantially evenly spatially distributed along the two-dimensional image. A data value having a round number is determining within each of the label regions and a label point corresponding to the data value within each of the label regions is determined. The label point within each of the label regions in the two-dimensional image is displayed along with the data value adjacent the label point within each of the label regions in the two-dimensional image.

32 Claims, 6 Drawing Sheets

SYSTEM AND METHOD FOR ADAPTIVELY LABELING MULTI-DIMENSIONAL IMAGES

BACKGROUND OF INVENTION

1. Field of the Invention

The invention relates generally to graphical displays of multi-dimensional objects. More specifically, the invention relates to adaptively positioning labels on a graphical display of a multi-dimensional object.

2. Background Art

Three-dimensional (3D) objects are commonly represented on computer displays in two dimensions (2D) for analysis. These displays often include data labels, e.g., the coordinates or data value of particular points in the object, or the identity of each subpart of the object, and the like. Data labels facilitate the analysis of the 3D objects. Computer displays also allow users to manipulate the 3D objects by rotating, translating, or zooming in and out of the displayed scenes. In addition, the computer displays may also allow the users to change the visual effects of the display, e.g., color, lighting, or texture mapping of the objects. All these permissible user requests are generally referred to as user-requested actions. 3D visualization software packages known in the art respond to motion-type (translation, rotation, and zooming) user-requested actions by moving the view point (i.e., a user's view point or a camera position) around a 3D scene. Translation is performed by moving the view point (camera position) relative to the displayed object, while rotation and zooming operations are performed by moving a user's view point (or camera position) relative to a pivot point, which is typically a point of interest (POI) in the scene. With each user-requested action, the display is redrawn. Consequently, the data labels, if present, need to be updated with each redrawing, i.e., with each user-requested action.

Software packages known in the art use subroutines to display data labels. These display subroutines typically are for labeling static images so that user intervention may be required to update or reposition labels when the graph or image is rotated, scaled, or otherwise manipulated. Without user intervention, such labels may be dissociated from their reference points and may obscure other labels or portions of the graphical image after each manipulation. In other types of software packages, the labels are associated with the displayed object and move with the object. These labels may become obscured or overlap the displayed image after the manipulation.

Furthermore, software packages known in the art label the object evenly along the 3D object. The distances between the labeled points become unevenly spatially distributed in the perspective 2D image. The uneven distribution of data labels makes it difficult to estimate the value of a point between two labeled points (i.e., difficult to interpolate). If the data labels are forced to be evenly spatially distributed in the 2D display, the corresponding data value on each data label will not be incremented by equal amounts. Consequently, the values for the data labels may include fractional numbers (non-integers). The extra digits in fractional numbers do not include substantial information, but they interfere with user's perception of the numbers and make interpolation difficult.

Thus there remains a need for improved techniques for the labeling and display of graphical images.

SUMMARY OF INVENTION

The invention provides a method for labeling a two-dimensional image of a multi-dimensional object. The method includes displaying the two-dimensional image of the multi-dimensional object; calculating a plurality of label regions in the two-dimensional image, the plurality of label regions being substantially evenly spatially distributed along the two-dimensional image; determining a data value having a round number within each of the label regions; finding a label point corresponding to the data value within each of the label regions; displaying the label point within each of the label regions in the two-dimensional image; and displaying the data value adjacent the label point within each of the label regions in the two-dimensional image.

Another aspect of the invention provides a method of labeling a two-dimensional image of a multi-dimensional object. The method includes displaying the two-dimensional image of the multi-dimensional object; determining a reference line for the multi-dimensional object; determining a first data value, the first data value being a most round number on the reference line for the multi-dimensional object; finding a start point corresponding to the first data value on the reference line for the multi-dimensional object; converting the reference line for the multi-dimensional object to a two-dimensional reference line; finding a first label point on the two-dimensional reference line, the first label point corresponding to the start point; calculating a plurality of label regions on the two-dimensional reference line, the plurality of label regions and the first label point being substantially evenly spatially distributed on the two-dimensional reference line; determining a data value in each of the label regions, the data value being a round number in each of the label regions; finding a label point corresponding to the data value in each of the label regions; displaying the label point in each of the label regions; and displaying the data value adjacent the label point in each of the label regions.

Another aspect of the invention provides a system for displaying a multi-dimensional object. The system includes means for displaying a two-dimensional image of the multi-dimensional object; and a computer operatively coupled to the means for displaying, the computer having a program to display the two-dimensional image of the three dimensional object, the program adapted to display data labels that are substantially evenly spatially distributed on the two-dimensional image, the data labels each having a data value comprising a round number.

BRIEF DESCRIPTION OF DRAWINGS

Other aspects and advantages of the invention will become apparent upon reading the following detailed description and upon reference to the drawings in which.

DETAILED DESCRIPTION

Two dimensional displays of multi-dimensional objects (e.g., 2D or 3D objects) offer a convenient way to study the multi-dimensional objects. In analyzing a multidimensional object, it is often necessary to know the data values that are associated with particular points of interest on the object. Therefore, most graphic display programs include capabilities to label the objects with relevant information. For example, software packages dealing with maps, graphs, or images may label the objects with coordinates, captions, numbers, etc.

Figure 1A:
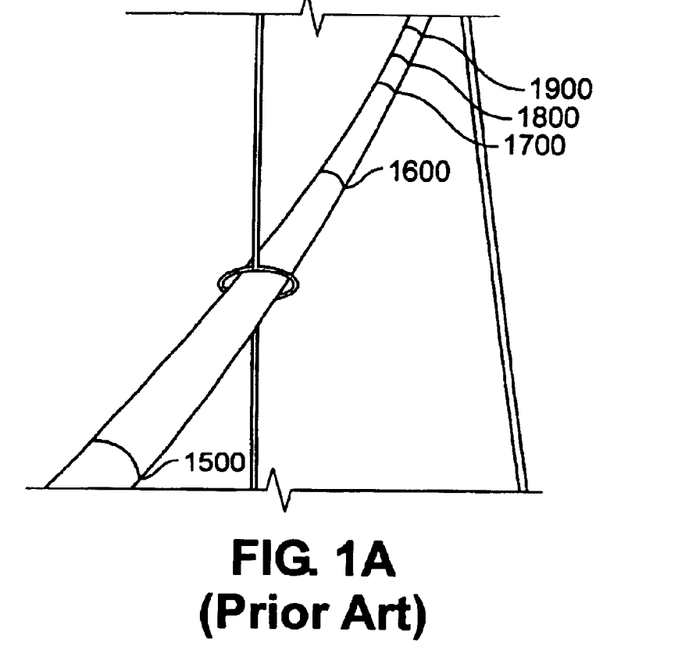
FIGS. 1(A) and 1(B) illustrate prior art 2D displays of 3D objects showing uneven distributions of labels and non-integer data values, respectively.
Figure 1B:
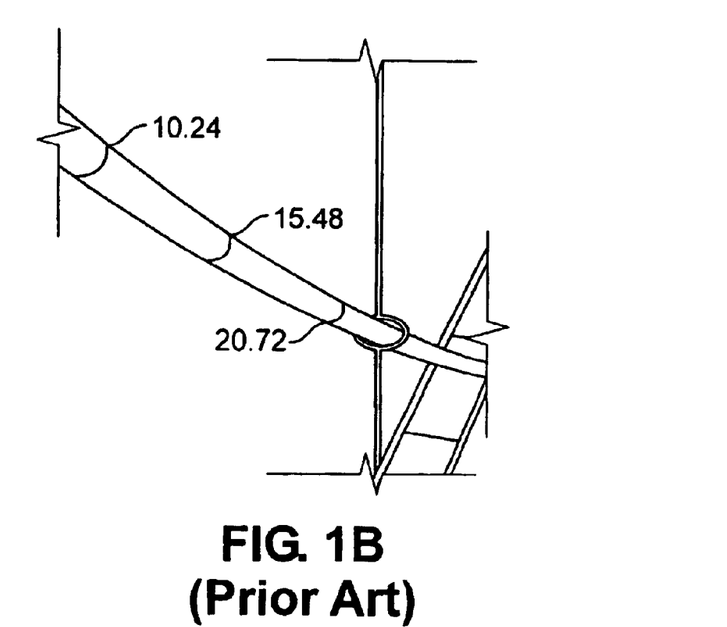

One important attribute of most 2D displays of 3D objects is that the 2D displays preserve the "perspectives" of the 3D objects, i.e., the displayed 2D images give 3D perception by presenting the images in proper aspect ratios. In presenting the image in proper aspect ratios, the 2D images do not have a linear correspondence with the 3D objects. Portions of the object farther away from the display plane (clip plane) are displayed with progressively reduced dimensions. Consequently, if data labels of the object are evenly spatially distributed in the 3D object, they will appear more densely packed in the parts of the object that are farther away from the display plane. As shown in FIG. 1(A), the labels appear unevenly distributed in the 2D image, though the values corresponding to these labels are evenly spatially distributed in the 3D object. The uneven distribution of the labels makes it difficult for a user to estimate (interpolate) the data value of a point between any two labeled points. If the labels were forced to be evenly spatially distributed in the 2D display, the data value would not increment by the same amount. This often results in the data label having non-integer values as shown in FIG. 1(B). The non-integer numbers make the displayed information less intuitive and difficult to interpolate.

Embodiments of the present invention relate to techniques for adaptively labeling multi-dimensional objects shown in 2D graphic displays so that labels will appear evenly spatially distributed and the labels are integer numbers, preferably having a smallest possible number of significant digits. These data labels will facilitate analysis of the 3D objects. In some embodiments, the labels may be dynamically and automatically updated as a user's view point of the display changes because of rotation, translation, scaling (e.g., "zooming"), and the like. In other embodiments, the user may be given the control as to when the data labels should be updated.

The adaptive labeling methods of the invention maintain substantially even spatial distributions of data labels. In addition, it is desirable that the data labels be displayed densely enough so that it would be easy for a user to accurately estimate (interpolate) data values of selected points along the displayed object by referring to the adjacent labels. For example, when showing measured depths (MD, which are lengths of a wellbore trajectory from the beginning of the trajectory) of a wellbore as data labels relative to the wellbore trajectory, it is desirable that a user be able to estimate (or interpolate) the MD values between adjacent pair of MD labels at any selected location along the wellbore trajectory. The density of the substantially evenly spatially distributed labels, however, should not be so great that the display is cluttered or that the image or other data labels are obscured by adjacent data labels. In addition, the data labels should be displayed in such a manner that it is apparent to the user to which point in the 2D image each label refers. This may be accomplished in embodiments of the invention by including lead lines that link or connect the data labels with the corresponding specific points in the display. The lead lines preferably do not obscure the displayed image or any adjacent data labels.

Figure 2:
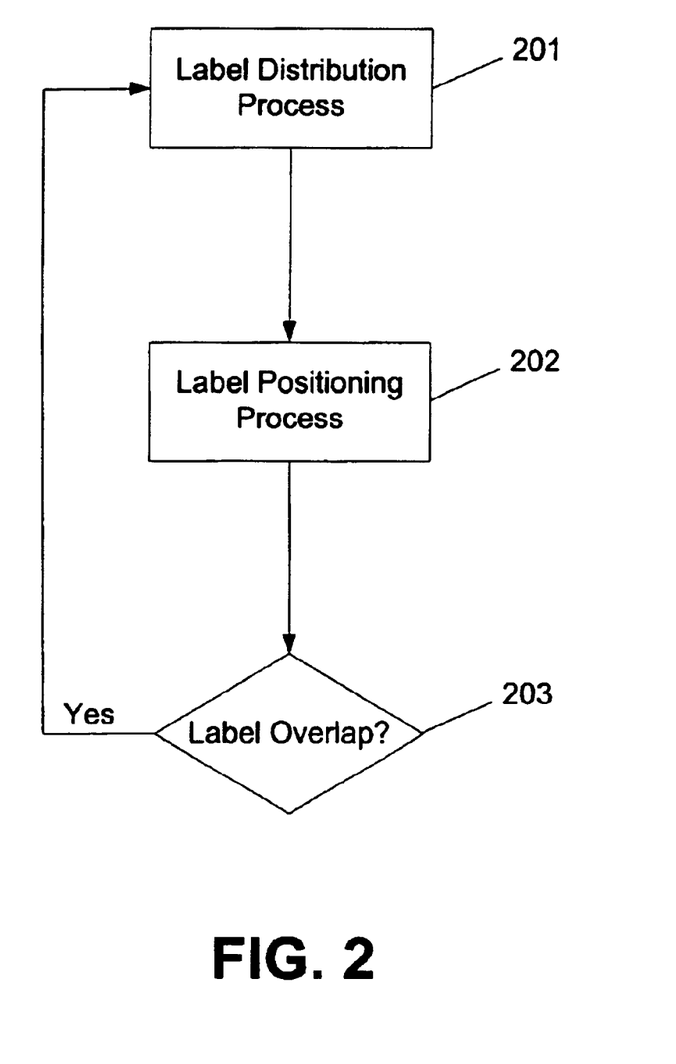
FIG. 2 shows a schematic of an adaptive labeling method according to one embodiment of the invention.

In some embodiments, a method of adaptive labeling may be divided into two processes. As shown in FIG. 2, the first process is a "label distribution process" 201, and the second process is a "label positioning process" 202. In addition, there is a control and feedback process 203, which checks to determine if the labels as positioned would overlap other labels or the displayed image. If overlap would occur, the label distribution process 201 is invoked to recalculate the label points and their associated data values. The control and feedback process 203 may be a separate process as shown in FIG. 2. Alternatively, the control and feedback process 203 may be part of the label positioning process 202.

The function of the label distribution process 201 according to the invention is to select label points and to determine the data values of these points so that the label positioning process 202 may place the data labels at proper locations. In selecting the label points, the label distribution process 201 tries to fulfill the following requirements to the extent possible: (1) the label points are so distributed that they appear substantially evenly spatially distributed in the 2D image; (2) and the label density is such that it is not too dense to crowd the display or too sparse to make it difficult to reliably interpolate the data value of a point between two labeled points; and (3) the labels are integers (round numbers), preferably round numbers having the smallest number of significant digits (these will be referred to as the "most round" numbers). A most round number is a number with the smallest number of significant digits among the group of numbers being compared. Various rules may be used to define the most round number. The following illustrates one example. Two numbers $x_1$, $x_2$ to be compared may be converted to the exponential notation: $x_1=0.a_1a_2.a_k$ $10^P$, $x_2=0.b_1b_2.b_m 10^q$. Number $x_1$ is a better candidate for the most round number than number $x_2$ if: (1) k<m., e.g., 430 is better than 433; (2) k=m, and p>q, 1000 is better than 400; or (3) k=m, and p=q, but last significant digit for $x_1$ is 5 ($a_k$=5) and last significant digit for $x_2$ is not 5, e.g., 435 is better than 433. According to these rules, there may be more than one "most round" number among a particular group of numbers. If so, all candidate "most round" numbers are output to the label distribution process 201, which then picks the most round number based on the even distribution requirement.

The label distribution process 201 may be implemented in various ways. In general, the process would take into account the desired label density, which may be selected by a user or automatically determined by the process. If the label density is determined by the label distribution process 201, the process may take into account, for example, the crowdedness of the display screen, the dimension of the object (scale factor), and the shape of the displayed object.

Based on the label density, the label distribution process 201 then calculates the label regions in the 2D image to place the data labels. The calculation may start from a first label point, which may be around a user selected location on the object or around one end of the displayed image. The first label point, according to embodiments of the invention, does not necessarily coincide with the user selected point or the end of the displayed image. Instead, the label distribution process finds a point in the vicinity of the user selected point or the end of the image so that the data label for this first point is a round number, preferably a "most round" number. Alternatively, the first label point may be identified as the point having the "most round" number in the displayed 2D image.

Starting from the first label point, the label distribution process 201 then finds the next label region based on the label density. While the label region where the next label point is located is determined by the label density, the precise location of the next label point is dictated by the requirement of a round number, and preferably a most round number within the label region. The process is then repeated starting from the newly defined point. The label distribution process 201 is repeated until all the locations for the labels have been determined.

The above process is sequential, i.e., the label distribution process 201 determines a label point and its data value before determining the next label point. An alternative approach is to determine all label regions first and then determine the label points and their data values. In this alternative, all label regions within which the labeled points will be placed may be first determined based on the display density. Then, a point is selected within each label region so that the data value of this point is a round number with the smallest number of significant digits within the region, ore more preferably a most round number.

While the above description outlines general approaches for label distribution process 201, the actual implementation of this process may vary depending on the particular types of the objects to be displayed. The following description uses a wellbore trajectory as a 3D object. It should be understood, however, that the invention is not limited to this specific example. For a pipe-like 3D object, such as a wellbore trajectory, the label distribution process 201 may be more efficiently performed on a 3D reference line (i.e., a curvilinear structure) representing the 3D object. U.S. application Ser. No. 09/948,027 filed on Sep. 6, 2001, by Fleury and assigned to the present assignee, describes various alternatives to representing a wellbore trajectory-like structure using curvilinear or wire-like structures. This application is herein incorporated by reference. For example, a wellbore trajectory may be represented by a curvilinear structure (3D reference line) running through the axis of the trajectory or a reference line on the surface of the trajectory.

In another approach, the wellbore trajectory may be treated as a plurality of connected segments, each of which may be substantially cylindrical in shape. Thus, embodiments of the invention that distribute labels relative to the wellbore would distribute the labels relative to the segments that comprise the wellbore model. The 3D reference line that represents the trajectory in this case may comprise a collection of segment reference lines of individual segments. The 3D reference line of each segment may coincide with the axis of the cylindrical segment or on the surface of the cylinder.

Figure 3:
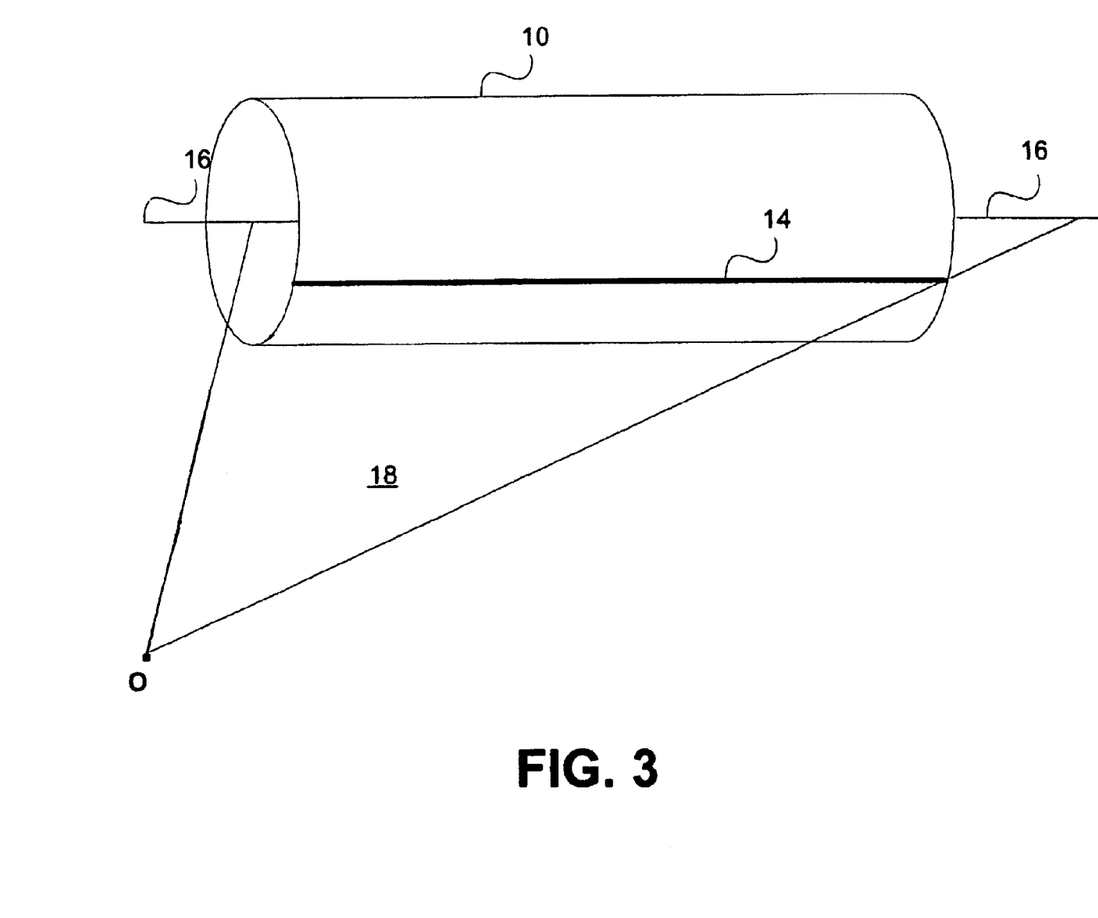
FIG. 3 shows a schematic of a segment reference line being defined as an intersection of the segment and a plane.
Figure 4:
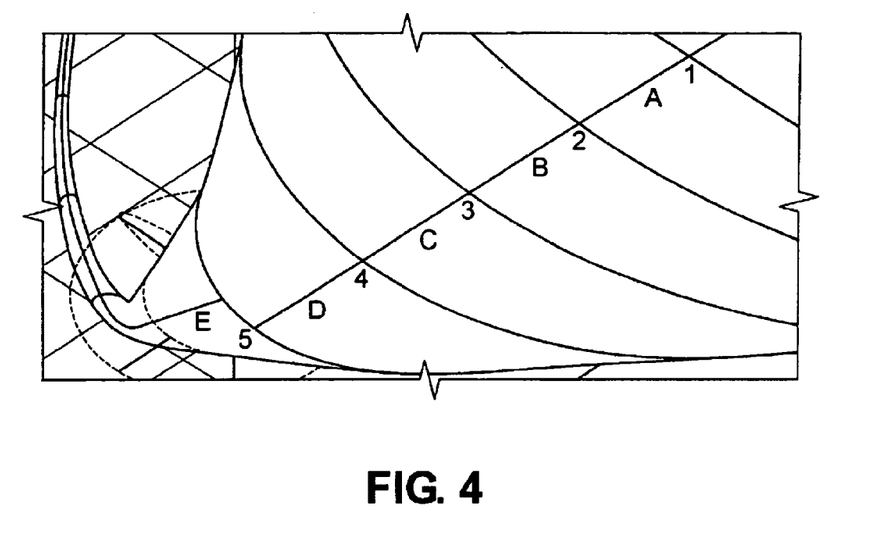
FIG. 4 illustrates the discontinuity of segment reference lines in a trajectory model represented by a plurality of segments.

FIG. 3 illustrates a technique of the invention for finding a reference line that is on the surface of a substantially cylindrical object (e.g., a segment of a wellbore trajectory). Such reference lines are less likely to be obscured by the displayed 2D image. FIG. 3 shows a segment 10 for example. A plane 18 may be defined by a view point (camera position) O and the axis of symmetry 16 of the segment 10. Plane 18 intersects the surface of the cylindrical segment 10 at the reference line 14. A reference line defined by this process is on the surface of the cylinder and is close to the user's view point (camera position). Other reference lines for other segments of the wellbore trajectory may be defined in a similar manner so that all of the segments visible in the display include reference lines. It should be noted that, in some situations, the reference lines of adjacent segments defined by this procedure may not be collinear or continuous. For example, FIG. 4 shows a well trajectory wherein adjacent reference lines A, B, C, and D are substantially collinear, while a discontinuity exists between reference lines D and E.

Figure 5:
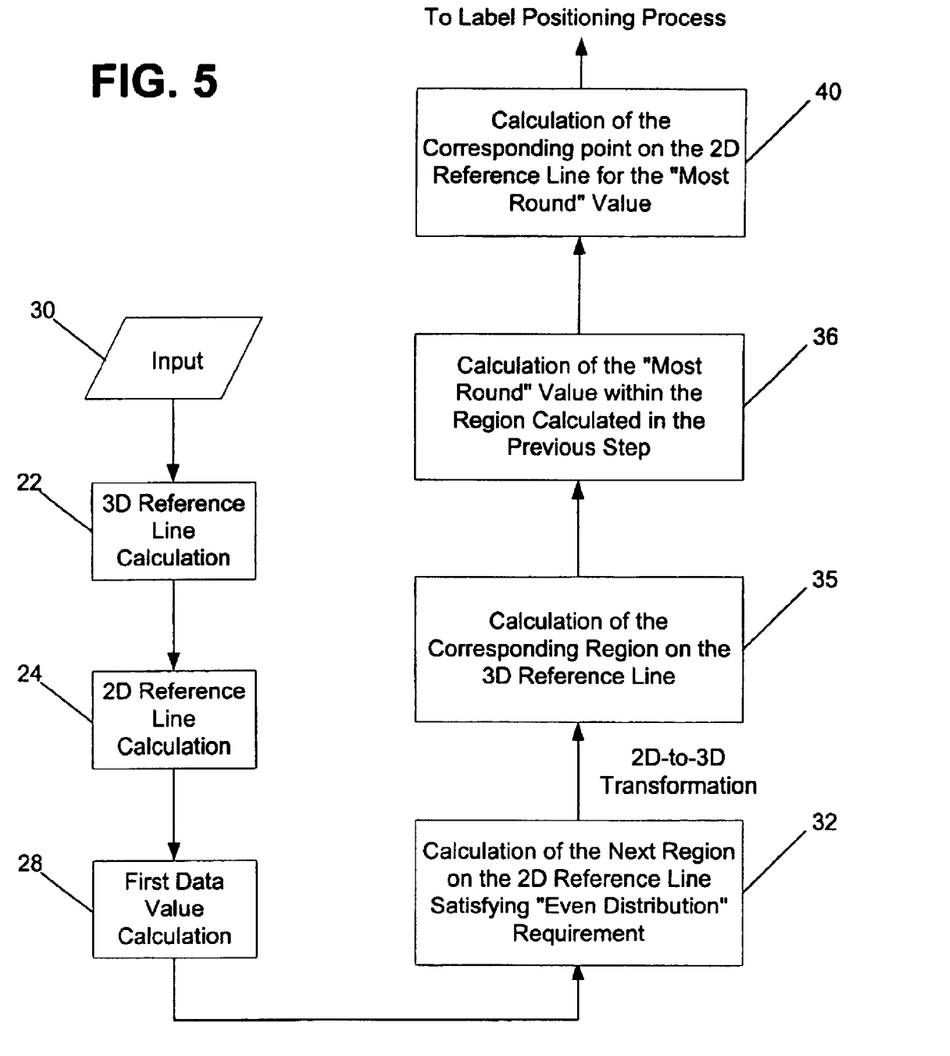
FIG. 5 illustrates a flow chart of a label distribution process according to one embodiment of the invention.

FIG. 5 illustrates a flowchart of one embodiment of the invention. A 3D well trajectory is first input (shown at 30) as a sequence of 3D coordinates of the trajectory or a series of attributes (e.g., length, diameter, and orientation) of segments that represent the trajectory. A 3D reference line is then determined (shown at 22) for the 3D object or for the portions of the 3D object within the display area. The 3D reference line may be a contiguous line (e.g., the axis) representing the trajectory, or a collection of 3D reference lines of segments that represent the trajectory. The 3D reference lines of the segments, which will be referred to as 3D segment reference lines, may be the axes of segments or on the surfaces of the segments as determined by the above-described procedures described above with reference to FIG. 3. The 3D reference line for the object is then transformed into a 2D reference line (shown at 24) using a 3D-to-2D transformation subroutine. Thus, a 2D or 3D reference line may comprise a contiguous reference line or a collection of segment reference lines.

In some embodiments, a data value for each point on the 3D reference line may be calculated and stored with each point on the 3D reference line. These stored data values are then associated with the corresponding points on the 2D reference line during the 3D-to-2D transformation. Thereafter, the subsequent processes of finding the label points and their associated data values can then be performed in 2D space without going back to the 3D coordinates.

In other embodiments, it might not be computer time or memory efficient to store the data values for all the points on the 3D reference line. Instead, the data values may be stored for the beginning and the end points on the 3D reference line, and the data values for all other points on the 3D reference line are calculated as needed. In these embodiments, the processes of finding the label points and their associated data values will need to be performed in both 3D and 2D spaces.

After the 3D reference lines are transformed into 2D reference lines, a first data value (e.g., MD value) is calculated (shown at 28). The first data value is the value for a point in the first label region where the first data label will be placed. In some embodiments, the first data value (e.g., MD value) may be determined by the program as the value having the "most round" number in the entire 2D image. In other embodiments, as stated above, the first label region may be around a point selected by the user or around one end of the displayed image (e.g., the beginning of a wellbore trajectory within the display area, or the first segment within the display area). The first data (e.g., MD) value is then found for a label point within this "first label region" so that the first data value is the most round number within this region.

The process of locating the first label point within the first label region and determining the corresponding data value may be performed on the 2D reference line, i.e., in 2D space, if the data values are associated with the points on the 2D reference line. Alternatively, these steps may be performed on the 3D reference line, i.e., in 3D space. If these processes are performed in 3D space, the resulting coordinates and the data value for the first point need to be converted by a 3D-to-2D transformation to the corresponding 2D coordinates.

After the first label point and its data value are calculated, the method then calculates (shown at 32) the next label region on the 2D reference line for placing the next label point based on a selected label density. In some embodiments, a user may input a selected label density. In other embodiments, a user may select to use a default label density associated with the adaptive labeling method. In yet other embodiments, the program automatically selects a proper label density by taking into account the following factors: the crowdedness of the 2D display, the scale factor of the displayed object, and the shape of the object. For example, if there is little blank area left on the display screen, the program may use fewer labels (lower label density), and vice versa.

With a label density selected, the method selects the next label region on the 2D reference line so that the label regions are evenly spatially distributed on the 2D reference line. One skilled in the art would know that the next label region, for example, may be found by tracing the 2D reference line from the first label point to a next point such that the distance between the first point and the next point falls within a selected range that is determined by the desired label density, i.e., $d_{min} \leq \sqrt{(x_1-x_2)^2+(y_1-y_2)^2} \leq d_{max}$, where $x_1$, $y_1$, $x_2$, and $y_2$ are the 2D coordinates of the first and the next points, and $d_{min}$ and $d_{max}$ delimit the allowed range of distance between the first and the next label points. Alternatively, the distance may be measured along the 2D reference line, i.e., the distance is defined as the length of the curvilinear 2D reference line from the first point to the next point. This alternative approach would produce a substantially even distribution as long as the 2D reference line does not have sharp bends or tight turns. As applied to a wellbore trajectory, which typically does not have any sharp bend or tight turn, this alternative approach might be more efficient.

With either approach, the values of $d_{min}$ and $d_{max}$ should be selected so that points within this range appear to be at substantially the same distance to the previous label point. The magnitude of the allowed range ($d_{max}-d_{min}$) depends on the distance between the label points and the user's perception. Typically, this allowed range may be less than 30% of the distance between adjacent label points, preferably around 25%.

Once the next label region is calculated, a label point within this label region is determined so that the associated data value for this label point is a round number, preferably a most round number within the area. The processes of selecting the next label region and selecting the label point within the region may be performed entirely in 2D space, if data values have been associated with the corresponding points on the 2D reference line (shown at 24 as discussed above). The processes are then repeated for the subsequent label points until all label points for the 2D image are determined.

In some embodiments, the data values are not associated with the points on the 2D reference line. In this case, the next label region calculated in process 32 (see FIG. 5) is used to calculate the corresponding label region on the 3D reference line (shown at 35) using a 2D-to-3D transformation routine. Then, a most round number data value is selected from points within the label region on the 3D reference line (shown at 36). The selected data value and its associated label point on the 3D reference line are used to calculate the corresponding label point on the 2D reference line (shown at 40) using a 3D-to-2D transformation routine. The processes are then repeated for the subsequent label points until all label points are found for the 2D image.

The above procedures describe a sequential process of finding the next label region and a point within the region before moving on to the next label region. However, in alternative embodiments, the process of selecting the next label region from the previously determined label region (or the first label point) may be completed for the entire 2D reference line before determining a point within each of the label regions (i.e., in a batch-wise manner).

Figure 6:
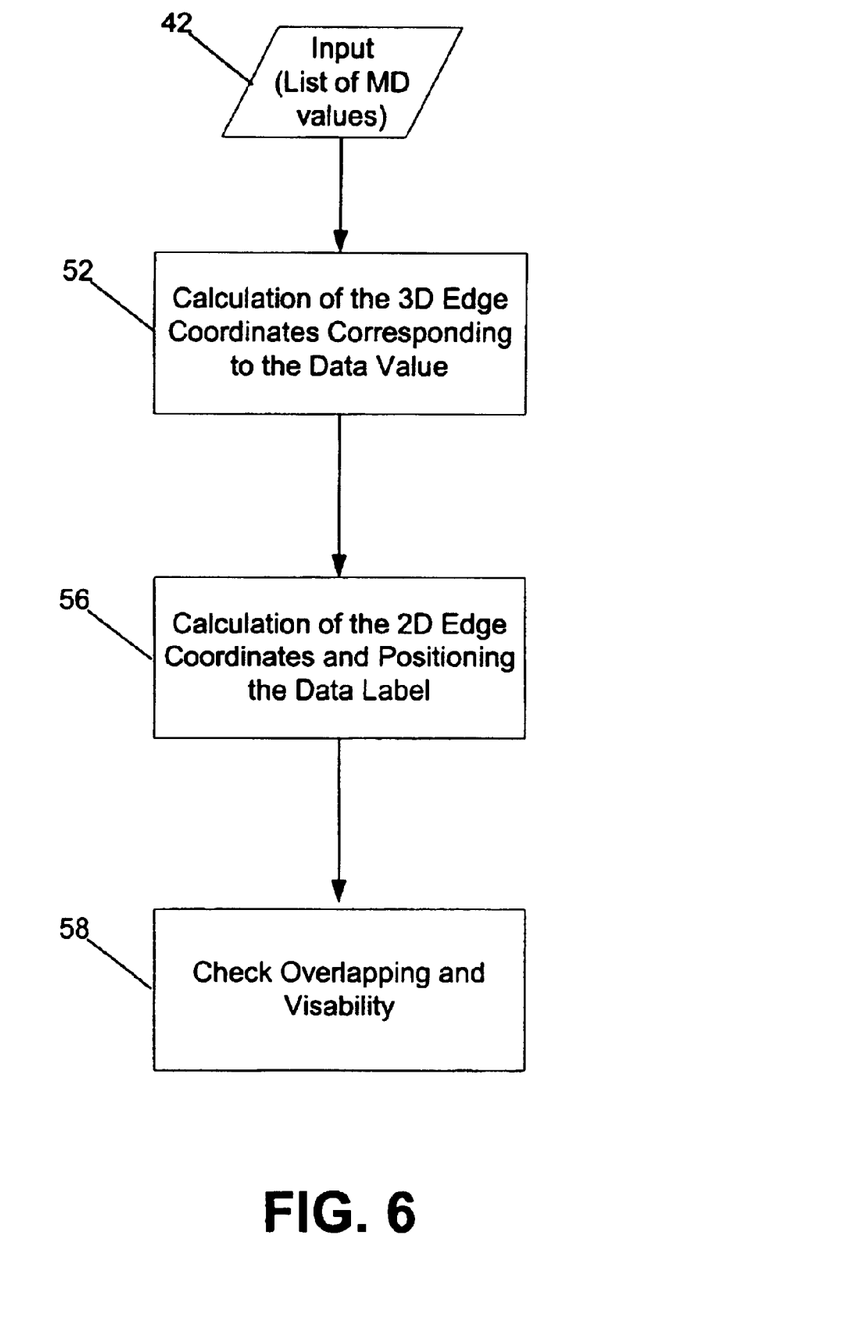
FIG. 6 illustrates a flow chart of a label positioning process according to one embodiment of the invention.

Once the label points are identified and their corresponding data values are determined, the label points are forwarded to the label positioning process (shown at 202 in FIG. 2). FIG. 6 illustrates detailed procedures of the label positioning process. The compiled list of label points (their coordinates) and their associated data values (e.g., MD values) are the input for the label positioning process. In its simplest form, the label positioning process (202 in FIG. 2) may place the data labels in the vicinities of the selected label points on the 2D reference line and use lead lines (or arrows, and the like) to associate each data label with its corresponding label point on the 2D reference line. The data points preferably are displayed in different colors (or textures, patterns, etc.) so that they are easily identified in the 2D image. While placing the data labels, the process finds a blank area nearby the label point so that the data label will not overlap other data labels or the displayed image. The lead lines may optionally be omitted if the data labels can be placed adjacent the label points and no confusion will arise as to which data label associates with which label point. This simple association of data labels with the label points on the 2D reference line is feasible if the 2D reference line is visible, e.g., the 2D reference line is on the surface of the cylinder representing the wellbore trajectory. If the 2D reference line is inside the cylindrical structure of the wellbore trajectory (e.g., the axis of the trajectory), the image of the trajectory may be displayed in translucent colors so that the 2D reference line is visible.

Figure 7:
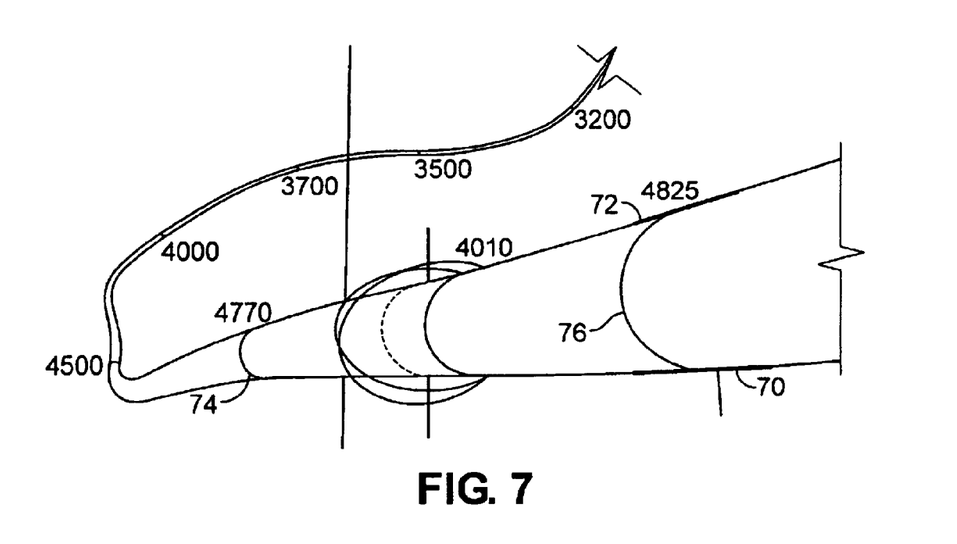
FIG. 7 illustrates coordinates of arcs that represent iso-MD values of a wellbore trajectory and edge coordinates around one of the arcs.

Alternatively, the data labels may be associated with the displayed object (i.e., the 2D image, e.g., surface of the trajectory model) rather than points on the 2D reference line. In this case, it would be necessary to calculate points on the displayed image having the selected data values. Using a wellbore trajectory as an example, the circular or oval intersection of the wellbore trajectory and a plane perpendicular to the wellbore axis (which is an iso-MD value plane) passing through the selected label point on the 3D reference line may be used to place the data labels. The circular or oval intersection defines points on the cylindrical surface of the trajectory that have the same MD values. The 3D coordinates of the points defining the circular or oval intersections will be transformed into 2D coordinates on the 2D image. On the 2D image, only parts of these points are visible and the remainders are obscured by the image, resulting in arcs, instead of circles or ovals, displayed on the image (74 and 76 in FIG. 7). The data labels are then displayed next to these arcs. It is preferred that the data labels be placed close to the arcs and not obscure the image. To avoid obscuring the 2D image, the edges of the displayed image around the arcs (70 and 72 in FIG. 7) are defined and used to guide the placement of the data labels.

FIG. 6 illustrates one exemplary procedure for calculating the edge coordinates and placing the data labels. The input data values (e.g., MD values; shown as 42) are used to locate regions on the 3D object where edges of the displayed image need to be defined (shown at 52). The 3D edge coordinates found are then converted into 2D coordinates by a 3D-to-2D transformation (shown at 56). The process then finds a blank area outside of the image as delimited by the edge coordinates to place the data labels nearby the arcs that correspond to the data values. The process also checks to see if the labels overlap other displayed items (data labels or displayed image). These processes 52, 56, and 58 are repeated for each data label. If any label overlaps the displayed image or any other data label, that labeled point is recalculated by the label distribution process (201 in FIG. 2 and FIG. 5). While the recalculation may be performed on the overlapping points only, in some embodiments, all label points (overlapped or not) may be recalculated by the label distribution process.

In some embodiments of the invention, the adaptive labeling methods are designed to adaptively and automatically reposition labels and maintain the desired aspects (e.g., the desired spacing and density) of the labels as the displayed trajectory is rotated, translated, or resized (e.g., scaled or zoomed) by a user-requested action or an automatic update of the displayed image. For example, every time a user resizes a window or changes a view point (camera position), the adaptive labeling methods automatically compute new label positions, values, and a label arrangement so as to maintain a desirable screen display. Moreover, the adaptive labeling methods are designed to update labels in a substantially short period of time so that automatic updating of the labels is substantially transparent to the user. In some embodiments, the adaptive labeling method let the user decide when to update the labels. Thus, programs implementing the methods of the invention may include a parameter indicating whether the user wants the automatic update feature. This parameter may be defaulted to automatic update, unless the user chooses otherwise, or vice versa. In addition, it is possible to allow the user to change this feature "on the fly" (during use), i.e., by defining a "hot key" that the user can use to turn the feature on and off.

The above are examples of methods according to embodiments of the invention. One skilled in the art would appreciate that other variations are possible. For example, the above described methods perform in a batch-wise fashion, i.e., the label distribution process (201 in FIG. 2) determines all label points and their data values first, then the label positioning process (202 in FIG. 2) places the labels on the display. However, it is possible to perform the label distribution process and the label positioning process in an interleaved fashion (point by point), i.e., a label point and its data value are determined and placed on the display, then the next point and its data value are determined and displayed.

Similarly, variations of how data labels are presented on the display are possible. For example, the data labels may be placed close to the label points to which they correspond without lead lines. Alternatively, the data labels may be placed at s selected distance away from their associated label points in the image and lead lines (or arrows) can be used to specifically associate each data label with the corresponding label point on the image. It is also possible to mix both labeling schemes, with and without lead lines, in the same display. When using lead lines (or arrows), it is preferred that the data labels be placed close to their label points. This can be accomplished with a maximum length limit on each lead line.

While the invention has been described with respect to displaying labels relative to a multi-dimensional object (e.g., a 3D wellbore trajectory), it should be understood that the methods may be used to adaptively display labels for a variety of displayed images, including 3D objects and 2D networks or roadmaps. For example, the adaptive labeling methods may be used to display labels relative to pipeline networks, air-traffic corridors (flight paths), and the like. In addition, the adaptive labeling method may be modified so that real-time data may be input into the method so that labels are substantially continuously updated so as to provide a real-time display of drilling activity, flight patterns, and the like.

Embodiments of the invention may be implemented as stand alone programs or as part of other graphic programs. In addition, these programs may reside in a computer that is operatively coupled to a display means, such as a computer display screen (e.g., a cathode-ray tube (CRT) or a liquid-crystal display (LCD), or a plasma screen) or a data projector (e.g., an LCD projector or the like) (not shown).

For the purposes of this specification it will be clearly understood that the word "comprising" means "including but not limited to", and that the word "comprises" has a corresponding meaning.

While the invention has been described with respect to a limited number of embodiments, those skilled in the art, having the benefit of this disclosure, will appreciate that other embodiments can be devised which do not depart from the scope of the invention as disclosed herein.

What is claimed is:

1. A method for labeling a two-dimensional image of a multi-dimensional object, comprising: displaying the two-dimensional image of the multi-dimensional object; calculating a plurality of label regions in the two-dimensional image, the plurality of label regions being substantially evenly spatially distributed along the two-dimensional image; determining a data value having a round number within each of the label regions; finding a label point corresponding to the data value within each of the label regions.

2. The method of claim 1, wherein the calculating a plurality of label regions comprises locating a first label region.

3. The method of claim 2, wherein the locating the first label region comprises finding a data value having a most round number in the two-dimensional image.

4. The method of claim 1, further comprising finding a two-dimensional reference line of the two-dimensional image.

5. The method of claim 4, wherein the finding the two-dimensional reference line comprises:

finding a multi-dimensional reference line of the multi-dimensional object; and converting the multi-dimensional reference line to the two-dimensional reference line.

6. The method of claim 4, wherein the calculating a plurality of label regions is performed on the two-dimensional reference line.

7. The method of claim 1, wherein the round number is a most round number.

8. The method of claim 1, further comprising:

determining whether any of the displayed data values overlaps the two-dimensional image; and if any of the displayed data values overlaps the two-dimensional image, removing the displayed data value and repeating the calculating the plurality of label regions, the determining the data value, the finding the label point, the displaying the label point, and the displaying the data value until no overlap is determined.

9. The method of claim 1, wherein the multi-dimensional object comprises a wellbore trajectory.

10. The method of claim 9, wherein the data value comprise a measured depth value.

11. The method of claim 9, further comprising finding a two-dimensional reference line of the two-dimensional image.

12. The method of claim 11, wherein the finding the two-dimensional reference line comprises:
   finding a reference line of the wellbore trajectory; and
   converting the reference line of the wellbore trajectory to the two-dimensional reference line.

13. The method of claim 9, wherein the wellbore trajectory is represented by a plurality of segments.

14. The method of claim 13, further comprising finding a two-dimensional reference line for each of the plurality of segments.

15. The method of claim 14, wherein the finding the two-dimensional reference line for each of the plurality of segments comprises:
   finding a segment reference line for each of the plurality of segments; and
   converting the segment reference line for each of the plurality of segments to the two-dimensional reference line for each of the plurality of segments.

16. The method of claim 15, wherein the segment reference line for each of the plurality of segments is located on a surface of each of the plurality of segments.

17. The method of claim 1, wherein the displaying the data value comprising displaying a lead line associating the data value with the label point.

18. A method of labeling a two-dimensional image of a multi-dimensional object, comprising: displaying the two-dimensional image of the multi-dimensional object; determining a reference line for the multi-dimensional object; determining a first data value, the first data value being a most round number on the reference line for the multi-dimensional object; finding a start point corresponding to the first data value on the reference line for the multi-dimensional object; converting the reference line for the multi-dimensional object to a two-dimensional reference line; finding a first label point on the two-dimensional reference line, the first label point corresponding to the start point; calculating a plurality of label regions on the two-dimensional reference line, the plurality of label regions and the first label point being substantially evenly spatially distributed on the two-dimensional reference line; determining a data value in each of the label regions, the data value being a round number in each of the label regions; finding a label point corresponding to the data value in each of the label regions.

19. The method of claim 18, wherein the determining the data value comprises:
   finding multi-dimensional label regions on the reference line for the multi-dimensional object, the multi-dimensional label regions corresponding to the plurality of label regions on the two-dimensional reference line; and
   finding the data value in each of the multi-dimensional label regions, the data value being a most round number in each of the multi-dimensional label regions.

20. The method of claim 18, wherein the finding the label point comprises:
   finding a temporary label point on the reference line for the multi-dimensional object, the temporary label point corresponding to the data value; and
   converting the temporary label point to the label point on the two-dimensional reference line.

21. The method of claim 18, wherein the multi-dimensional object comprises a plurality of segments.

22. The method of claim 21, wherein the determining a reference line for the multi-dimensional object comprises determining a segment reference line for each of the plurality of segments.

23. The method of claim 22, wherein the determining the segment reference lines comprises:
   defining a plane with respect to each of the plurality of segments, the plane including a camera position and an axis of symmetry of each of the plurality of segments; and
   determining each of the plurality of segment reference lines as an intersection of the plane and a surface of each of the plurality of segments.

24. The method of claim 18, wherein the multi-dimensional object comprises a wellbore trajectory.

25. The method of claim 24, wherein the data value comprises a measured depth value.

26. The method of claim 18, wherein the displaying the label point comprises:
   calculating three-dimensional edge coordinates of a surface adjacent each of a plurality of regions of the multi-dimensional object corresponding to each of the plurality of the label regions on the two-dimensional reference line;
   transforming the three-dimensional edge coordinates into two-dimensional edge coordinates; and
   determining a location for displaying the label point in each of the label regions on the two-dimensional image from the two-dimensional edge coordinates.

27. The method of claim 18, further comprising:
   determining whether any of the displayed data values overlaps the two-dimensional image; and
   if any of the displayed data values overlaps the two-dimensional image, removing the displayed data value and repeating the calculating the plurality of label regions, the determining the data value, the finding the label point, the displaying the label point, and the displaying the data value until no overlap is determined.

28. The method of claim 18, wherein the round number is a most round number.

29. The method of claim 18, wherein the multi-dimensional image comprises a flight path.

30. The method of claim 18, wherein the multi-dimensional image comprises a pipeline structure.

31. A system for displaying a multi-dimensional object, comprising:
   means for displaying a two-dimensional image of the multi-dimensional object; and the program adapted to display data labels that are substantially evenly spatially distributed on the two-dimensional image, the data labels each having a data value comprising a round number.

32. The system of claim 31, wherein the round number is a most round number.

* * * * *